United States Patent
Uhrenholt et al.

(10) Patent No.: US 12,086,454 B2
(45) Date of Patent: Sep. 10, 2024

(54) DATA PROCESSING SYSTEMS INCLUDING A DATA ENCODER THAT READS IN DATA FROM AND RETURNS DATA TO AN EXTERNAL MEMORY SYSTEM

(71) Applicant: Arm Limited, Cambridge (GB)

(72) Inventors: Olof Henrik Uhrenholt, Lund (SE); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 109 days.

(21) Appl. No.: 17/455,601

(22) Filed: Nov. 18, 2021

(65) Prior Publication Data

US 2022/0164128 A1 May 26, 2022

(30) Foreign Application Priority Data

Nov. 23, 2020 (GB) ..................................... 2018385

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 8,542,939 B2 | 9/2013 | Nystad | |
| 8,990,518 B2 | 3/2015 | Nystad | |
| 9,014,496 B2 | 4/2015 | Nystad | |
| 9,116,790 B2 | 8/2015 | Nystad | |
| 9,864,541 B2* | 1/2018 | Malyugin | G06F 3/0604 |
| 2016/0283391 A1 | 9/2016 | Nilsson | |
| 2018/0364917 A1* | 12/2018 | Ki | G06F 12/1018 |
| 2019/0179782 A1* | 6/2019 | Hogan | G06F 13/20 |
| 2019/0318446 A1 | 10/2019 | Ray | |

OTHER PUBLICATIONS

Combined Search and Examination Report dated Aug. 24, 2021, GB Patent Application No. GB2018385.1.

* cited by examiner

*Primary Examiner* — Mark A Giardino, Jr.
(74) *Attorney, Agent, or Firm* — Vierra Magen Marcus LLP

(57) ABSTRACT

A data processing system includes an external memory system, a processor and an internal memory system. The internal memory system includes an internal memory that stores data for use by the processor when performing data processing operations. The internal memory system also includes a data encoder associated with the internal memory. The data encoder reads data from the external memory system to the data encoder and returns the data to the external memory system from the data encoder, without storing the data in the internal memory.

15 Claims, 6 Drawing Sheets

DATA PROCESSING SYSTEMS INCLUDING A DATA ENCODER THAT READS IN DATA FROM AND RETURNS DATA TO AN EXTERNAL MEMORY SYSTEM

CROSS-REFERENCE TO RELATED APPLICATIONS

This application claims priority pursuant to 35 U.S.C. 119(a) to United Kingdom Patent Application No. 2018385.1, filed Nov. 23, 2020, which application is incorporated herein by reference in its entirety.

BACKGROUND

The technology described herein relates to data processing systems and in particular to systems for and methods of handling data in data processing systems, such as graphics processing systems.

Data processing systems, such as graphics processing systems, will typically use a cache (a cache system) to store data locally to a processor, e.g. graphics processor (graphics processing unit (GPU)), that is to process the data. This helps to reduce the need to fetch data from slower data stores, such as main memory of the data processing system.

One operation that may be required in a data processing system is a memory transcoding or copying operation, in which data in memory is to be stored in the memory in a different format and/or to be copied to another location in memory.

These memory transcoding or copying operations may be performed by the data processor, e.g. GPU, performing an appropriate operation on the data, which is then returned to the memory. To do this, the data will be fetched from (e.g. main) memory into a cache, from where it can be accessed by the data processor. The data processor, e.g. GPU, then operates on the data, which is then returned to memory via the cache.

The Applicants believe that there remains scope for improved data handling operations in data processing systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
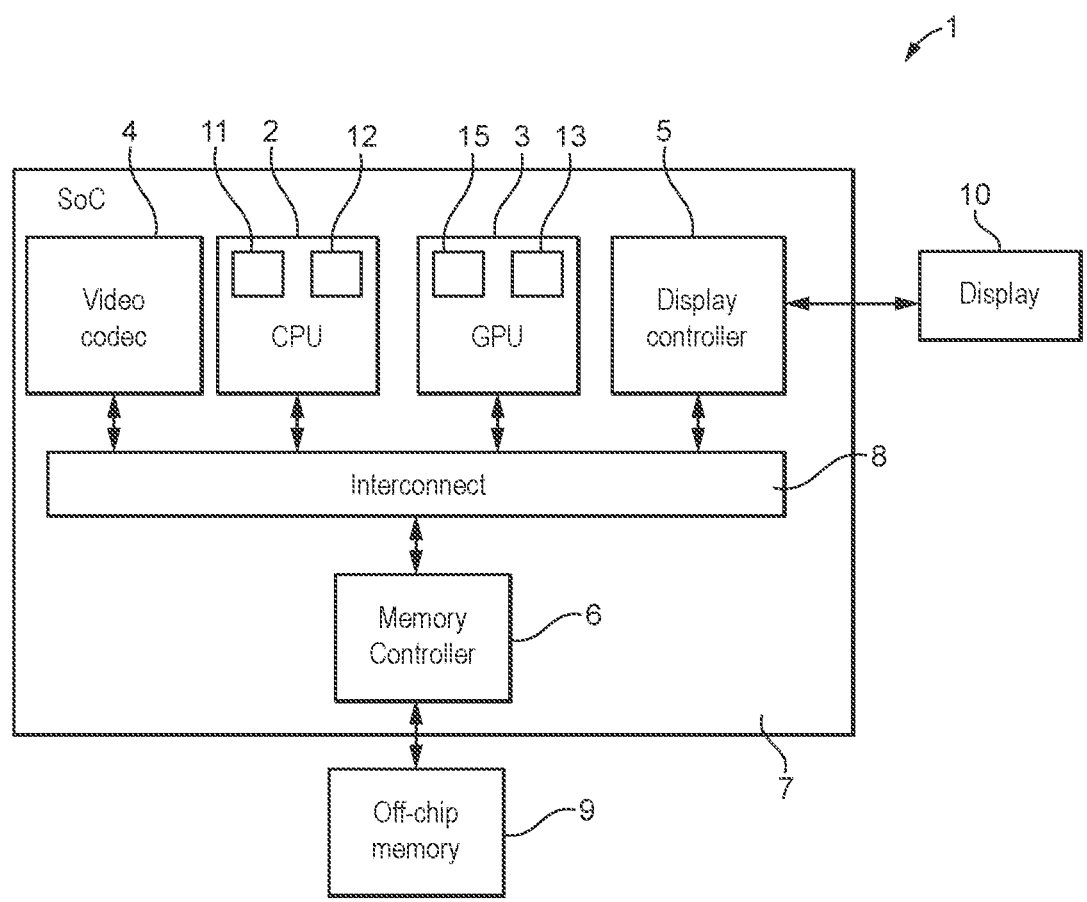
FIG. 1 shows an exemplary graphics processing system in which the technology described herein may be implemented.

An embodiment of the technology described herein comprises a method of operating a data processing system, the data processing system comprising:

a processor; and
an external memory system;
wherein the processor comprises an internal memory system comprising:
an internal memory configured to store data for use by the processor when performing data processing operations, and
a data encoder associated with the internal memory and operable to read data from the external memory system and store it in the internal memory, and read data from the internal memory and store it in the external memory system;
the method comprising:
the data encoder:
reading data from the external memory system to the data encoder;
optionally processing the read in data; and
returning the, optionally processed, data to the external memory system from the data encoder, without the data encoder storing the data in the internal memory.

Another embodiment of the technology described herein comprises a data processing system comprising:
a processor; and
an external memory system;
wherein the processor comprises an internal memory system comprising:
an internal memory configured to store data for use by the processor when performing data processing operations; and
a data encoder associated with the internal memory and operable to read data from the external memory system and store it in the internal memory, and read data from the internal memory and store it in the external memory system;
wherein the data encoder is further controllable to:
read in data from the external memory system, optionally perform some processing on the read in data; and
return the, optionally processed, data to the external memory system, without the data encoder storing the data in the internal memory.

The technology described herein relates to data processing systems that include an external (e.g. main) memory system and a processor (e.g. GPU) that includes an internal (e.g. on-chip) memory system.

The internal memory system includes a memory (e.g. a cache) configured to store data (e.g. received from the external (e.g. off-chip) memory system) for use by the processor. The internal memory system also includes a data encoder associated with the internal memory, which can read data from the external memory system and store it in the internal memory (e.g. as will be discussed further below, after decoding (decompressing) the data) and, correspondingly, read data from the internal memory and store it in the external memory system (e.g. after encoding (compressing) the data).

However, in the technology described herein, the data encoder is also operable and controllable to read in data (e.g. directly) from the external memory system, optionally process the data, and write out that same (optionally processed) data back (e.g. directly) to the external memory system, without storing the data in the internal memory.

This then provides a more streamlined process for reading and writing data from and to external memory, e.g. for memory copy or transcoding operations. In particular, as the data encoder can read in and write out the data (as well, for example, perform operations such as memory transcoding or copying), the data encoder can be used to perform such operations without need to involve the (e.g. execution (processing) cores of the) processor or the internal memory.

Owing to the data not being handled by the (e.g. execution cores of the) processor or the internal memory (but rather, at least in some embodiments, only by the data encoder, e.g. with the data being read directly from and written directly to the external memory), it will be appreciated that this process is faster and more efficient. Using the data encoder for these (e.g. memory transcoding and copying) operations, frees up the (e.g. execution cores of the) processor for other (e.g. more intensive) data processing operations. Using the data encoder may also be more energy efficient than running the (e.g. execution cores of the) processor to perform these tasks.

Avoiding using the internal memory to store the data also helps to save time and power, and helps to reduce cache pollution, because the data can be read in directly to the data encoder and then written straight back to the external memory.

Furthermore, using the data encoder to perform these tasks allows compressed data to be handled, either being read in or written out, depending on how the data is (to be) stored in the external memory.

The data processing system of the technology described herein includes an external memory system, and a processor that includes an internal memory system.

The external memory (external memory system) of the data processing system that the internal memory system interfaces with, and which is external to the processor (e.g. an off-chip memory), may comprise any suitable and desired external memory and external memory system of the data processing system, such as a main memory for the data processing system. In an embodiment the external memory system is a lower level memory system than the internal memory system.

When the data processing system comprises a graphics processing system (e.g. of an overall data processing), comprising a graphics processor, the graphics processing system may comprise a separate external memory system for the graphics processor, or the external memory (external memory system) of the graphics processing system may comprise a main memory of the data processing system that is shared with other elements, such as a host processor (CPU), of the data processing system.

The processor of the data processing system may comprise any suitable and desired processor that is operable to perform data processing operations, e.g. on an array of data. For example, the processor may comprise a graphics processing unit (GPU), a central processing unit (CPU), a digital signal processor (DSP), a neural processing unit (NPU) or a microcontroller unit (MCU).

In one embodiment the processor comprises a graphics processor and, e.g., the data processing system comprises a graphics processing system. Thus, in an embodiment, the graphics processor is operable to perform graphics processing operations on (an array of) data. The (e.g. graphics) processor should, and in an embodiment does, comprise one or more (e.g. a plurality of) execution (shader) cores, which are (e.g. each) operable to perform data (e.g. graphics) processing operations on (an array of) data to be processed by the (e.g. graphics) processor.

In an embodiment, the internal memory is configured to receive and store data from the processor. In an embodiment, the internal memory is correspondingly configured to receive and store data from the external memory system, so to be available to (e.g. when requested by) the processor. In an embodiment, the data is stored in the internal memory in an uncompressed (decoded) format.

The internal memory system (e.g. that is configured between the external memory system and the processor) may be any suitable and desired internal memory system that is operable to and configured to hold data, e.g. between the processor (the execution core or cores of the processor) and the external memory system. In an embodiment, the internal memory system comprises an "on-chip" memory system of the processor. In an embodiment, the internal memory system is a higher level memory system than the external memory system.

The internal memory system may comprise a buffer system (and thus the internal memory comprises a buffer) of the processor, or the internal memory system may comprise a memory system that is tightly coupled to execution core(s) of the processor (and thus the internal memory comprises a memory tightly coupled execution core(s) of the processor). In a set of embodiments the internal memory system comprises a cache system of the processor, and the internal memory comprises a cache of the cache system.

The type of internal memory system used may depend on the type of processor of the data processing system on which the internal memory system is provided. For example, an NPU may comprise a buffer system; a CPU, DSP or MCU may comprise a tightly coupled memory system; a GPU may comprise a cache system.

The internal memory (e.g. cache) system may comprise a single memory (e.g. cache) "level", in which case it will be that memory (e.g. cache) level that is associated with the data encoder (and that stores data, e.g. in an uncompressed form, for use by the processor when performing data (e.g. graphics) processing operations).

In embodiments, the internal memory (e.g. cache) system comprises multiple memory (e.g. cache) levels (a memory (e.g. cache) hierarchy), such as L2 and L3 caches. In this case, the internal memory (e.g. cache) that is associated with the data encoder is one level of the internal memory (e.g. cache) system (with other levels of the internal memory (e.g. cache) system then not having a data encoder associated with them). In this case, the internal memory (e.g. cache) that is associated with the data encoder is an internal memory (e.g. cache) level that is closer to the processor (e.g. the execution core(s) of the processor) than another memory (e.g. cache) level of the internal memory (e.g. cache) system. In an embodiment, the memory (e.g. cache) level of the memory (e.g. cache) hierarchy that is associated with the data encoder (and from which data is provided to and received from the (e.g. execution core(s) of the) processor) is an L2 cache.

The data encoder that is associated with the internal memory (e.g. cache) may be any suitable and desired data encoder. The data encoder should, and in an embodiment does, comprise an appropriate codec (data coder/decoder, e.g. data transcoder) operable to and configured to encode (compress) data to be written out from the data encoder (when necessary, via the data encoder from the processor and/or the internal memory) to the external memory system and, e.g., to decode (decompress) data read in from the external memory system (when necessary, to be stored in the internal memory and/or for use by the processor).

The data encoder may comprise a plurality of codecs. The plurality of codecs may be configured to encode and decode the data using a plurality of (e.g. different) encoding and decoding techniques respectively.

Thus, another embodiment of the technology described herein comprises a data encoder for use in a data processing system, wherein:

the data encoder is operable to read data from an external memory system of a data processing system and store it in an internal memory associated with a processor of a data processing system that the data encoder is associated with, and read data from an internal memory associated with a processor of a data processing system and store it in an external memory system;

the data encoder is controllable to:

read in data from an external memory system of a data processing system, optionally perform some processing on the read in data; and return the, optionally processed, data to an external memory system, without the data encoder storing the data in an internal memory associated with a processor of a data processing system.

Another embodiment of the technology described herein comprises a method of operating a data encoder for use in a data processing system, wherein:

the data encoder is operable to read data from an external memory system of a data processing system and store it in an internal memory associated with a processor of a data processing system that the data encoder is associated with, and read data from an internal memory associated with a processor of a data processing system and store it in an external memory system;

the method comprising:

the data encoder:

reading data from an external memory system of a data processing system to the data encoder;

optionally processing the read in data; and returning the, optionally processed, data to an external memory system from the data encoder, without the data encoder storing the data in an internal memory associated with a processor of a data processing system.

The data encoder and the method of these embodiments may include one or more (e.g. all) of the optional features outlined herein, as appropriate. The technology described herein also extends to a (e.g. graphics) processor comprising an internal memory system, the internal memory system comprising an internal memory and the data encoder associated with the internal memory, and to a method of operating an (e.g. graphics) processor.

The data encoder (e.g. the codec(s) of the data encoder) may use any suitable and desired encoding and, e.g., decoding technique(s). Thus the data encoder may be configured to perform any suitable and desired encoding (e.g. compression) and, e.g., decoding (e.g. decompression) operation(s), e.g. in dependence on the compression format(s) that may be used for the data.

The data encoder may be configured to encode uncompressed data in any suitable and desired way, e.g. in "compression" blocks (e.g. of a particular data size). Thus, in an embodiment, the data encoder is configured to encode and, e.g., decode data using a block-based encoding (compression) technique. In this case, the data will be encoded (compressed) using a block-based compression scheme, and thus stored as respective (compressed) blocks of data in the external memory system.

The block(s) of data may be encoded (compressed) and decoded (decompressed) using any suitable and desired encoding (compression) technique. In one set of embodiments the method comprises (and the data encoder is configured to) encoding the block(s) of data using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2. In one set of embodiments the method comprises (and the data encoder is configured to) also or instead encoding the block(s) of data using a fixed rate compression technique.

Thus data (including the data that is to be read in by the data encoder and then that is written out by the data encoder) may be stored in the external memory in any suitable and desirable form, in an uncompressed or compressed format.

The data may comprise any suitable and desired data that a (e.g. graphics) processor may use or generate. In an embodiment, the data comprises array(s) of data, e.g. array (s) of data elements each having an associated data value(s). The (e.g. array of) data may comprise, for example, an image (or portion thereof) that the (e.g. graphics) processor is generating, and thus the data will comprise appropriate colour values, e.g. for the data elements (sampling positions) of the data array and that the data array represents. In this case, the data array may comprise, for example, a tile or frame (a tile or frame buffer), e.g. of image data, that the (e.g. graphics) processor is generating, e.g. for display.

Thus, in some embodiments, the data that is being handled in the manner of the technology described herein may comprise (be divided into) a plurality of smaller portions (e.g. blocks) of data, with the method of the technology described herein being performed for each portion of data. Each portion may correspond to portion of data (e.g. a portion of a frame, such as a tile) that is generated or processed by the (e.g. graphics) processor and/or that is encoded for storing (in the external memory) in a compressed format.

In some embodiments, the data comprises (e.g. graphics) texture data for use by the (e.g. graphics) processor. In some embodiments the data comprises geometry data, such as for or of vertices and/or primitives that the (e.g. graphics) processor is to process. In some embodiments the data comprises weight and activation data that the processor (e.g. neural processing unit) is to process, e.g. for machine learning processing.

Thus, in an embodiment, the (e.g. array of) data that is read in by the data encoder and handled in the manner of the technology described herein comprises image data (e.g. a texture, tile or frame) or geometry data (positions and/or attributes).

In one embodiment, when the data is read by the data encoder from the external memory system (independently of the internal memory), no processing of (or on) the data is performed, such that the data returned to external memory is the same data as the data that is read in. Thus, the data encoder may be configured and controlled simply to read in data from the external memory to the data encoder and to write out the same data back to the external memory (e.g. to a different memory location (e.g. buffer) in the external memory), without performing any additional operation(s) on the data, e.g. a memory to memory copy operation. For example, in this embodiment, the data encoder may write out the same data back to the external memory in the same data format (layout) and the same compression format (as the format of the data that is read in), without performing any encoding or decoding of the data, and without performing any conversion of the data format (layout).

In one embodiment, when the data is read by the data encoder from the external memory system, the data encoder is configured and controlled to process (e.g. perform a data processing operation on) the data that has been read in, before the data is written back to external memory (independently of the internal memory). In this case, the data that is returned to the external memory is the processed data (i.e. the data that has been read by the data encoder and then processed by the data encoder).

The processing that is performed by the data encoder on the data that has been read by the data encoder from the external memory may comprise any suitable and desired processing operation. In an embodiment, the processing operation comprises converting a format of the data. For example, the processing may comprise one or more (e.g. all) of: a decoding or encoding (decompression or compression) operation, a data layout conversion operation and a data representation conversion operation.

In the technology described herein, when data is read in by the data encoder from the external memory system and written out by the data encoder back to the external memory system (independently of the internal memory), the data may be read in to the data encoder and written out to the external memory in any suitable and desired data representation (e.g. colour space), data format (e.g. layout) and compression format, e.g. depending on how the data is stored (and is to be stored) in the external memory (compressed or uncompressed).

In an embodiment, the data encoder is operable and controllable to do one or more (e.g. any combination) of: read in data in a compressed format (when the data is stored in the external memory in a compressed format); read in data in an uncompressed format (when the data is stored in the external memory in an uncompressed format); write out data in a compressed format (when the data is to be stored in the external memory in a compressed format); and write out data in an uncompressed format (when the data is to be stored in the external memory in an uncompressed format).

In one embodiment the data encoder is configured and controllable to read in compressed data from the external memory (owing to the data being stored in a compressed format in the external memory) and decode the compressed data read from the external memory into an uncompressed format. In one embodiment the data encoder is configured and controllable to write the uncompressed data back to the external memory (to the same or a different location (buffer)).

In one embodiment, the data encoder is configured and controllable to encode uncompressed data into a compressed format, and write out the compressed data to the external memory for storing in a compressed format. The uncompressed data may be uncompressed data that is read from the external memory (owing to the data being stored in a uncompressed format in the external memory) or compressed data that is read from the external memory (owing to the data being stored in a compressed format in the external memory) and decoded by the data encoder into an uncompressed format. In an embodiment, the data encoder is configured and controllable to encode data upon the data being written out from the data encoder to the external memory.

As outlined above, data may be stored in any suitable and desired compression format in the external memory, using any suitable and desired compression technique to decode and encode the data. Thus the data encoder may be configured and controllable to decode compressed data from any suitable and desired compression format, e.g. after or on reading in compressed data from the external memory. Similarly, the data encoder may be configured and controllable to encode uncompressed data into any suitable and desired compression format, e.g. before or on writing out the compressed data to the external memory.

Depending on the compression technique used (or to be used), if any, to encode the data, the data encoder may be configured and controllable to encode and/or decode the data from and to (and using) any suitable and desired compression format (technique), e.g. the same compression format or between different compression formats. Thus, in the set of embodiments in which the data is read in from the external memory in a compressed format, decoded into an uncompressed format, encoded into a compressed format and (the compressed data) written out to the external memory to be stored in the compressed format, the data may be encoded into the same compression format from which it was decoded.

However, in an embodiment, the data is encoded into a different compression format from which it was decoded. Thus, in an embodiment, the data encoder is configured and controllable to perform a memory to memory compression transcoding operation (i.e. to perform this compression format conversion).

In one set of embodiments, the data encoder is configured and controlled to convert the data layout of the data. This may be desired, for example, when data is being passed between different processing units of the system, such as between the graphics processor (GPU) and the host processor (CPU), and vice versa.

This may be done with or without also decompressing and/or compressing the data, e.g. depending upon whether the data is stored, or is to be stored, in a compressed format.

In this case, the data encoder will read in data to the data encoder that is stored in one (a first) data layout in the external memory, and write out the data from the data encoder (to be stored) in another (a second) data layout in the external memory. Thus, in an embodiment, the data encoder converts the data into a different data layout upon the data being written out from the data encoder to the external memory.

The data may be converted between any suitable and desired data layouts, e.g. depending on the type of data that is being handled by the data encoder. In one embodiment, the data is converted between a linear layout (e.g. for use by a CPU) and a multi-dimensional (e.g. two-dimensional) layout (e.g. for use by a GPU), or vice versa. For example, the (e.g. image or texture) data may be converted between a (one-dimensional) raster layout and a (two-dimensional) array layout, or vice versa. The multi-dimensional (e.g. two-dimensional) layout may comprise a block-based layout (e.g. with or without compression of the data). The block-based layout may comprise a block interleaved layout, e.g. using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

In one set of embodiments, the data encoder is configured and controlled to convert the representation of the data. This may be done with or without also decompressing and/or compressing the data, e.g. depending upon whether the data is stored, or is to be stored, in a compressed format.

The conversion of the data representation may depend on the type of data that is being read in and written out by the data encoder. For example, the data that is read in by the data encoder may comprise image data. The data encoder may convert image data between different image data representations (e.g. colour spaces). For example, the data encoder may convert image data between different YUV representations, such as between 3-plane YUV (e.g. YUV444) and 2-plane YUV (e.g. YUV420), or vice versa. The data encoder may convert image data between different colour encoding representations, e.g. between YUV and RGB (or vice versa).

It will be appreciated that the conversion of the data between different representations may (implicitly) involve compression of the data (e.g. by selective removal of some of the data). For example, the data may be down-sampled. When converting image data between 3-plane YUV (e.g. YUV444) and 2-plane YUV (e.g. YUV420) data, for example, some image data is lost (and thus the data can be said to be compressed).

When the data is read in from the external memory in a compressed format, the data encoder, in an embodiment, decodes the compressed data into an uncompressed format, before the layout and/or representation of the data is converted. The data may then be encoded, after its layout and/or representation has been converted, before writing out back to the external memory. The data layout and/or representation conversion operation may be combined with the encoding operation.

The data encoder, e.g. between reading in the data and writing out the data, may store the data (e.g. temporarily). In one set of embodiments the data encoder comprises (local) storage, e.g. one or more (internal) buffers of the data encoder. In an embodiment, the storage of the data encoder is separate from, and independent of, the internal memory and/or the external memory. In an embodiment, the data encoder is configured and controllable to store the data read from the external memory in the storage, e.g. while the data is being processed and/or before the data is written back to (towards) the external memory system.

Thus, the data will be temporarily buffered in the data encoder while it is being processed, before it is output, etc. Correspondingly the method comprises storing the data that is read from the external memory in the (local) storage (e.g. buffer) of the data encoder. This allows the data to be stored in a convenient location while performing any desired processing of the data, and avoids having to use the (or an) internal memory of the internal memory system for storing the data.

In an embodiment, the data is stored in an uncompressed format in the storage of the data encoder. Thus, as outlined above, in an embodiment the data encoder is configured to decode (decompress) data that is read in from the external memory in a compressed format.

In an embodiment, when the data is read in (and written out) by the data encoder in the manner of the technology described herein, the data is not read by (or stored in) the processor, e.g. between the data being read in from and written out to the external memory by the data encoder. In this way, in an embodiment, the data does not touch and is not processed by the processor, as part of (i.e. for performing (and during)) the read-write procedure (and any processing of the data that may be performed) of the technology described herein by the data encoder.

When the data is read in (and written out) by the data encoder in the manner of the technology described herein, the data is not fetched by or stored in the internal memory (e.g. level) associated with the data encoder, e.g. between the data being read in and written out by the data encoder. In an embodiment, as outlined above, the data encoder comprises (local) storage (e.g. one or more buffers) for storing the data read in by the data encoder. In this way, the data need not and does not touch and is not processed by the internal memory, as part of (i.e. for performing (and during)) the read-write procedure (and any processing of the data that may be performed) of the technology described herein by the data encoder.

The data may be read from and written back to any suitable and desired location in the external memory system. Thus, for example, the data may be read from and written back to the same or a different external memory location (e.g. buffer) in the external memory. This may depend on the operation (if any) that is performed on the data when or after it is read in to the data encoder. For example, a memory to memory copy operation may be arranged to write the data back to a different external memory location.

Operation of the (e.g. data encoder of the) data processing system, in the manner of the technology described herein, may be controlled in any suitable and desired way.

In an embodiment, this is done by a controller (control circuit), such as a microcontroller, that is operable to control the data encoder to operate in the manner of the technology described herein, i.e. inter alia to read in data from the external memory and to write out the data back to the external memory.

In an embodiment, the controller is operable to recognise commands for processing operations to be performed, e.g. that are provided in the form of a command stream, and to recognise commands for memory to memory transcoding and copying operations to be performed, and in response thereto, control the data encoder to operate accordingly.

In an embodiment, the controller is a controller of and for the processor (e.g. graphics processor), e.g. that is operable to receive commands for (e.g. graphics) processing operations to be performed by the processor, and to control execution units (cores) of the processor to perform those operations.

Thus, in an embodiment, the controller (control circuit) that controls the operation of the data encoder in the manner of the technology described herein comprises a controller (control circuit) of the processor of the data processing system. In an embodiment, the controller is separate from, and independent of, the execution (shader) core(s) of the processor (and, in an embodiment, is also operable to control the execution (shader) core(s) of the processor).

Correspondingly, in an embodiment, the data encoder is controlled directly by the controller, e.g. without involving the execution core(s) of the processor, at least when performing data handling operations in the manner of the technology described herein. However, as will be discussed, for other (e.g. graphics) processing operations, the data encoder may also be controlled by the execution core(s) of the processor, e.g. via the internal memory.

In an embodiment, the data processing system correspondingly comprises a command stream generating circuit (e.g. a driver for the (e.g. graphics) processor) operable to prepare, in response to a request for an operation to be performed from an application, commands and a command stream for causing an execution unit (e.g. the data encoder or an execution core of the processor) to perform the operation for the application.

Thus, in an embodiment, the data processing system comprises a host processor, with applications being executed by the host processor being operable to make requests for data handling operations (such as memory to memory copy, memory transcoding, data layout and representation conversion operations) to be performed, in response to which the command stream generating circuit will include in a command stream, inter alia, commands for implementing data handling operations (such as memory to memory copy, memory transcoding, data layout and representation conversion operations), (as well as, for example, commands for other (e.g. graphics) processing operations).

The command stream can then be provided (made available) to the (e.g. graphics) processor for implementation by an appropriate execution unit. In an embodiment, the controller (e.g. of the processor) is operable to cause the hardware execution resources of the (e.g. graphics) processing system, e.g. on the (e.g. graphics) processor or the data encoder, as appropriate, to perform the required operation (s), in response to the commands in the command stream.

The selective scheduling of processing tasks by the controller between the processor and the data encoder outside of the execution cores of the processor thus forms another embodiment of the technology described herein comprising a data (e.g. graphics) processing system comprising:
 a processor comprising:
  one or more execution cores; and
  a controller operable to read commands of a command stream, and to, in response to one or more commands within the command stream, cause one or more of the execution cores to perform a processing operation or operations;
 wherein the data processing system further comprises a data encoder that is external to the one or more execution cores, and that is operable, inter alia, to read in data from a memory system, optionally perform some processing of the read in data, and return the, optionally processed, data to the memory system; and
 wherein the controller of the processor is further operable to, in response to a command in a command stream, cause the data encoder to read in data from a memory system, optionally perform some processing of the read in data, and return the, optionally processed, data to the memory system.

Another embodiment of the technology described herein comprises a method of operating a data (e.g. graphics) processing system, the data processing system comprising:
 a processor comprising:
  one or more execution cores; and
  a controller operable to read commands of a command stream, and to, in response to one or more commands within the command stream, cause one or more of the execution cores to perform a processing operation or operations;
 wherein the data processing system further comprises a data encoder that is external to the one or more execution cores, and that is operable, inter alia, to read in data from a memory system, optionally perform some processing of the read in data, and return the, optionally processed, data to the memory system;
 wherein the controller of the processor is further operable to, in response to a command in a command stream, cause the data encoder to read in data from a memory system, optionally perform some processing of the read in data, and return the, optionally processed, data to the memory system;
 wherein the method comprises:
  the controller of the processor, in response to a command in a command stream:
   causing the data encoder to read in data from a memory system, optionally perform some processing of the read in data, and return the, optionally processed, data to the memory system; or
   causing one or more of the execution cores to perform a processing operation or operations.

Thus, the controller is operable to cause either the processor or the external data encoder, as appropriate, to implement the operations specified by the commands. In an embodiment, the method also comprises the execution cores and the data encoder implementing the commands (to thus perform the operations specified by the command), in response to being controlled by the controller.

The processor and the method of these embodiments may include one or more (e.g. all) of the optional features outlined herein, as appropriate. The technology described herein also extends to a data (e.g. graphics) processing system comprising the processor and to a method of operating a data (e.g. graphics) processing system.

Thus, in an embodiment, the controller is configured to recognise commands (e.g. in a command stream) relating to data handling operations (such as memory to memory copy, memory transcoding, data layout and representation conversion operations) and, in response to the recognition of such a command, cause the data encoder, to perform such operations. This allows these operations to be performed without needing to involve the execution core(s) of the processor.

The data encoder may be external to the processor, as well as to the execution cores of the processor. However, in an embodiment the processor comprises the data encoder.

In an embodiment, the controller is operable to, in response to a command to perform a "data handling" operation, issue one or more control signals to the data encoder (that is to implement the command), in order to control the data encoder to implement the command (to perform the requested operation). The control signals may set appropriate parameters for the data handling operation(s), The control signal(s) issued to the data encoder for implementing the commands may comprise any suitable and desired information. A set of control signals for a processing task may include an initial set of control signals for setting the parameters for the processing tasks, and then a control signal for performing the processing task. The data encoder will then, as appropriate, and in response to the control signals, perform the operation indicated by the command.

The control signals issued to the data encoder for implementing commands for data handling operations may comprise indications of one or more (e.g. all) of: the type of processing task to perform for the data handling operation; the location (e.g. memory address(es)) of the (source) data to be read in from the external memory; the size of the (source) data to be read in from the external memory; the data layout of the (source) data to be read in; the compression format of the (source) data to be read in; the compression rate of the (source) data to be read in; the location (e.g. memory address(es)) to which the (destination) data is to be written out; the size of the (destination) data to be written out; the data layout in which the (destination) data is to be written out; the compression format in which the (destination) data is to be written out; and the compression rate at which the (destination) data is to be written out.

Where a data handling operation is to be performed for an overall data array (e.g. frame) by the data encoder operating on a plurality of portions (e.g. blocks) of the data array, the controller may be operable and controllable to issue control signals for each portion (block) of data individually, and the, e.g., data encoder is operable to implement the command for each portion of data in turn in response to the respective control signals. However, in an embodiment, the controller is operable and controllable to issue a (single) set of control signals for the data array (e.g. frame of data) as a whole with the data encoder then being operable and controllable to, in response to the set of control signals, operate on each portion (block) of data individually to implement the command for data array (e.g. frame) as a whole.

The data processing system and method of the latter embodiments may, for example, also comprise an (e.g. external) memory system and, e.g., an internal memory (e.g. cache) system. In an embodiment, the internal memory (e.g. cache) system comprises an internal memory (e.g. cache) configured to store data for use by the processor when performing data processing operations. In an embodiment, the internal memory (e.g. cache) system is configured to transfer data stored in the (e.g. external) memory system to the processor for use by the data processor when performing data processing operations and to transfer data from the data processor to the (e.g. external) memory system.

In an embodiment, the data encoder is associated with the internal memory (e.g. cache) and operable to read data from the (e.g. external) memory system and store it in the internal memory (e.g. cache), and read data from the internal memory (e.g. cache) and store it in the (e.g. external) memory system.

In an embodiment, the data encoder is configured to:
when data is to be written from the internal memory (e.g. cache) to the (e.g. external) memory system, encode uncompressed data from the internal memory (e.g. cache) for storing in the (e.g. external) memory system in a compressed format and send the data in the compressed format to the (e.g. external) memory system for storing; and
when data in a compressed format is to be read from the (e.g. external) memory system into the internal memory (e.g. cache), decode the compressed data from the (e.g. external) memory system and store the data in the internal memory (e.g. cache) in an uncompressed format.

Thus, in an embodiment, the data encoder can receive (and respond to) requests from (e.g. be controlled by) the internal memory (e.g. cache) for performing encoding and decoding operations, e.g. in order to transfer data between the (e.g. external) memory system and the processor for performing data processing operations. Such requests may, e.g., by triggered by the execution cores of the processor making appropriate memory transaction requests.

It will thus be appreciated that, in embodiments of the technology described herein, the data encoder is configured to be controlled both by the controller (e.g. for performing data handling operations) and by the internal memory (e.g. cache) (e.g. for performing encoding and decoding operations relating to memory transactions for execution cores of the processor).

The technology described herein may be used in and with any suitable and desired data (e.g. graphics) processing system and processor.

As one example, the technology described herein may be used with tiled renderers (tile-based graphics processing systems). Thus, in an embodiment, the graphics processor (processing pipeline) is a tiled-based graphics processor (processing pipeline). However, other arrangements would of course be possible.

In an embodiment, the various functions of the technology described herein are carried out on a single processing platform.

In an embodiment, the data or graphics processing system and/or (e.g. graphics) processor also comprises, and/or is in communication with, one or more memories and/or memory devices that store the data described herein, and/or that store software for performing the processes described herein. The data or graphics processing system and/or (e.g. graphics) processor may also be in communication with a host microprocessor, a display controller (or display processing unit), and/or with a display for displaying images based on the data generated by the (e.g. graphics) processor (processing pipeline).

The technology described herein may be implemented in any suitable system, such as a suitably configured microprocessor based system. In some embodiments, the technology described herein is implemented in computer and/or micro-processor based system.

The various functions of the technology described herein may be carried out in any desired and suitable manner. For example, the functions of the technology described herein may be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., when desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that may be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the features described herein.

The methods in accordance with the technology described herein may be implemented at least partially using software, e.g. computer programs. Thus, in some embodiments, the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a (e.g. graphics) processor, renderer or other system comprising a data processor causes in conjunction with said (e.g. graphics) processor, renderer or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus, in some embodiments, the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Like reference numerals are used for like elements and features in the Figures, where appropriate.

A number of embodiments of the technology described herein will now be described in the context of a graphics processing system. However, it will be appreciated that the techniques for performing the tasks described herein can be used in non-graphics contexts as well.

FIG. 1 shows an exemplary graphics processing system 1 in which the technology described herein and the present embodiments may be implemented.

The exemplary graphics processing system 1 shown in FIG. 1 comprises a host processor comprising a host processor such as a central processing unit (CPU) 2, a graphics processor (graphics processing unit (GPU)) 3, a video codec 4, a display controller 5 and a memory controller 6, which are in the form of a system on chip (SoC) 7. As shown in FIG. 1, these units communicate via an interconnect 8 and have access to an off-chip memory system (memory) 9. In this system, the graphics processor 3, the video codec 4 and/or host processor 2 will generate frames (images) to be displayed and the display controller 5 will then provide frames to a display 10 for display.

In use of this system, an application 11, such as a game, executing on the host processor (CPU) 2 will, for example, require the display of frames on the display 10. To do this the application 11 will generate API (Application Programming Interface) calls that are interpreted by a driver 12 for the graphics processing unit 3 that is executing on the host processor 2. The driver 12 will then generate appropriate commands to be provided to the graphics processor 3 in response to commands from the application 11 running on the host processor 2 for graphics output (e.g. to generate a frame to be displayed).

In the present embodiments, the appropriate commands and data for performing the processing tasks required by the application 11 are provided to the graphics processor 3 in the form of one or more command streams, that each include sequences of commands (instructions) to cause the graphics processor 3 to perform desired processing tasks.

The command streams are prepared by the driver 12 on the host processor 2 and may, for example, be stored in appropriate command stream buffers, from where they can then be read by the graphics processor 3 for execution. Each command stream will contain commands (instructions) to set parameters for graphics processor tasks, as well as commands (instructions) to execute a task, etc.

In order to facilitate this operation, the graphics processor 3 includes, as shown in FIG. 1, a command stream frontend 15 that includes a command stream supervisor (job controller), in the form of a microcontroller, and one or more command stream execution units. The job controller is configured to schedule and issue commands from the command streams to respective command stream execution units, and the command stream execution units then execute the commands in the respective command streams to trigger the processing execution units of the graphics processing system 1 to perform the desired processing tasks, in response to commands in the command stream(s). Such processing execution units include a plurality of execution (shader) cores 14 of the graphics processor 3 and an encoder 17 of the cache system 13, e.g. as shown in FIG. 2.

As part of the processing to provide a graphics output, the graphics processor 3 will read in data, such as textures, geometry to be rendered, etc. from the memory 9, process that data, and then return data to the memory 9 (e.g. in the form of processed textures and/or frames to be displayed), which data will then be read from the memory, e.g. by the display controller 5, for display on the display 10. Thus there will need to be transfer of data to and from the graphics processor 3 (in particular to and from the execution cores 14 of the graphics processor 3) and the memory 9.

In order to facilitate this and to reduce the amount of data that is output to the memory 9 during graphics processing operations, the graphics processor 3 also comprises a cache system 13, arranged between the execution cores 14 of the graphics processor 3 and the memory 9. The cache system 13 is operable to transfer data between the memory 9 and the execution cores 14 of the graphics processor 3 and vice versa. The cache system 13 thus helps to control the sending of data (e.g. blocks of pixels) generated by the graphics processor 3 to the memory 9 (and vice versa, for data required by the graphics processor 3).

Figure 2:
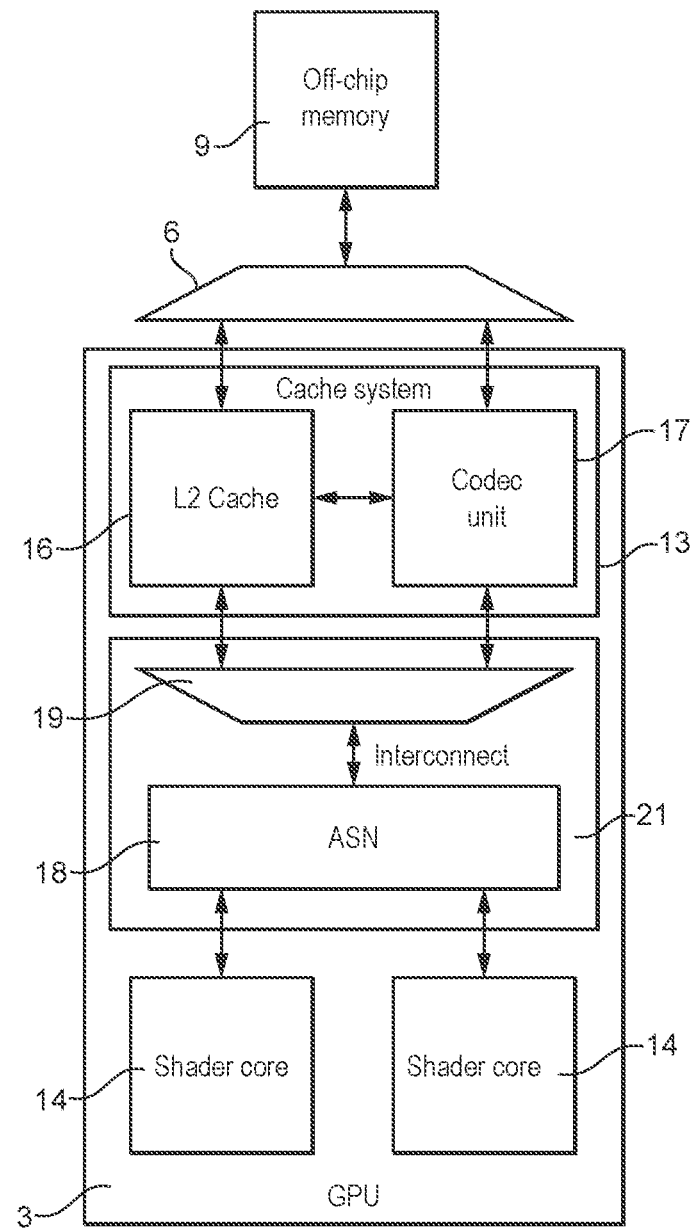
FIG. 2 shows an embodiment of the cache system of the graphics processing system of FIG. 1 in more detail.

FIG. 2 shows schematically and in more detail the elements of the graphics processing system 1 (including components of the cache system 13) that are relevant to the operation of the present embodiments, and in particular to the transferring of data to and from the memory 9. As will be appreciated by those skilled in the art, there may be other elements of the system, etc., that are not shown in FIG. 2.

FIG. 2 shows the memory 9 and the graphics processor 3. The graphics processor includes multiple execution (shader) cores 14 an internal interconnect 21 and a cache system 13.

As shown in FIG. 2, in between the memory 9 and the execution (shader) cores 14 of the graphics processor 3, there is a cache system 13 that is operable to transfer data from the memory 9 to the graphics processor 3 (and in particular to the execution cores (shader cores) 14 of the graphics processor 3), and conversely to transfer data produced by the execution cores 14 of the graphics processor 3 back to the memory 9.

The cache system shown in FIG. 2, is illustrated as including an L2 cache 16 from which data is provided to the shader cores 14. Other cache hierarchy arrangements would be possible, such as comprising multiple cache levels, if desired. As shown in FIG. 2, in this embodiment data is transferred from the memory 9 to the L2 cache 16, and from the L2 cache 16 to the shader cores 14 (and vice-versa).

In order to facilitate the handling of compressed data from the memory 9 (and for returning compressed data to the memory 9) via the memory controller 6 when that is required, as shown in FIG. 2, the L2 cache 16 has associated with it a data encoder 17 (in the form of a codec unit).

This data encoder 17 is operable to decompress data received from the memory 9 before storing that data in an uncompressed form in the L2 cache 16 for use by the shader cores 14 of the graphics processor 3, and, conversely, to compress data (either that is to be evicted from the L2 cache 16 or that is received directly from the shader cores 14) prior to sending that data back to the memory 9.

The data encoder 17 is also operable to read data from the memory 9 and to return (write out) data back to the memory 9 (e.g. for transcoding, memory-to-memory copy, data representation conversion or data layout conversion operations), without the data being stored in the L2 cache 16 or being transferred to or used by the shader cores 14 of the graphics processing unit. This operation of this data encoder (codec unit) 17 will be discussed in more detail below.

Figure 3:
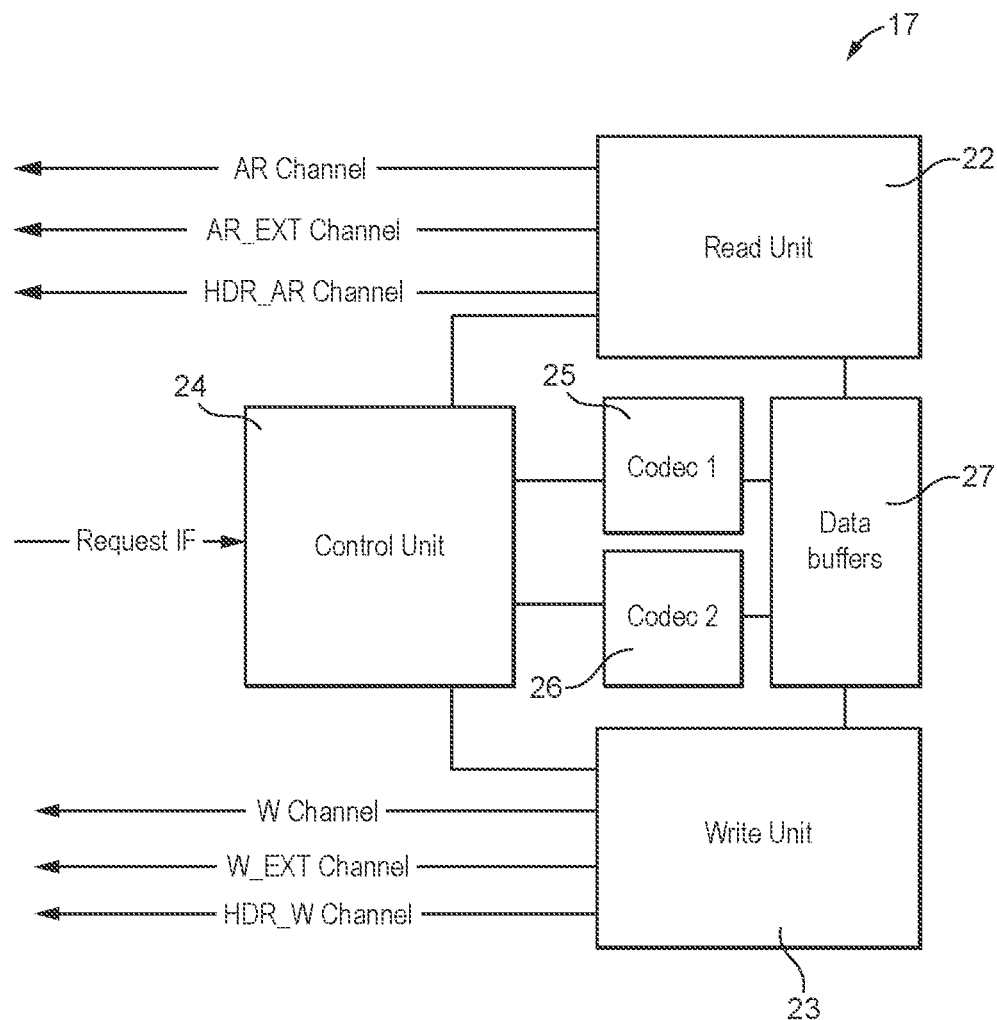
FIG. 3 shows an embodiment of the data encoder in more detail.

FIG. 3 shows an embodiment of the data encoder (codec unit) 17 in the present embodiments. As shown in FIG. 3, the data encoder 17 includes respective read 22 and write 23 units (circuits) that are operable to, respectively, read data from the L2 cache and the memory system, and write data to the L2 cache and to the memory system. The data encoder 17 also includes an appropriate control unit (circuit) 24 that receives read and write requests from the shader cores, the L2 cache controller and the job controller of the command stream frontend 15. The control unit 24 of the data encoder also controls the data encoder 17 to respond to those requests accordingly and appropriately.

As shown in FIG. 3, the data encoder 17 also includes one or more codecs 25, 26 and a set of data buffers 27 for temporarily storing data in the data encoder 17 while that data is processed and/or while waiting to write that data to the L2 cache or the memory system.

The data encoder 17 can include any desired number of codecs, e.g. that are each respectively operable to perform a different encoding (compression) scheme. For example, one codec may be configured to perform an appropriate variable rate compression scheme, with the other codec being configured to perform an alternative, e.g. fixed rate compression scheme.

Other arrangements would, of course, be possible.

The graphics processor 3 also includes, as shown in FIG. 2, an appropriate internal interconnect 21 for transferring data between the L2 cache 16 and/or the data encoder 17, and the shader cores 14. The interconnect 21 comprises, in this embodiment, an asynchronous switch network (ASN) 18 and an arbiter 19. The arbiter 19 is configured to determine whether data from the shader cores 14 is to be directed to the L2 cache 16 or the data encoder 17.

In the present embodiments, the data (e.g. data arrays of frames of data) that are being processed by the graphics processor 3 are stored as respective blocks of data (blocks of the frames of data) in the memory 9, with each data block being stored in the memory 9 in a compressed form, but being stored in the L2 cache 16 for the graphics processor 3 in an uncompressed form for use by the shader cores 14 of the graphics processor 3.

Figure 4:
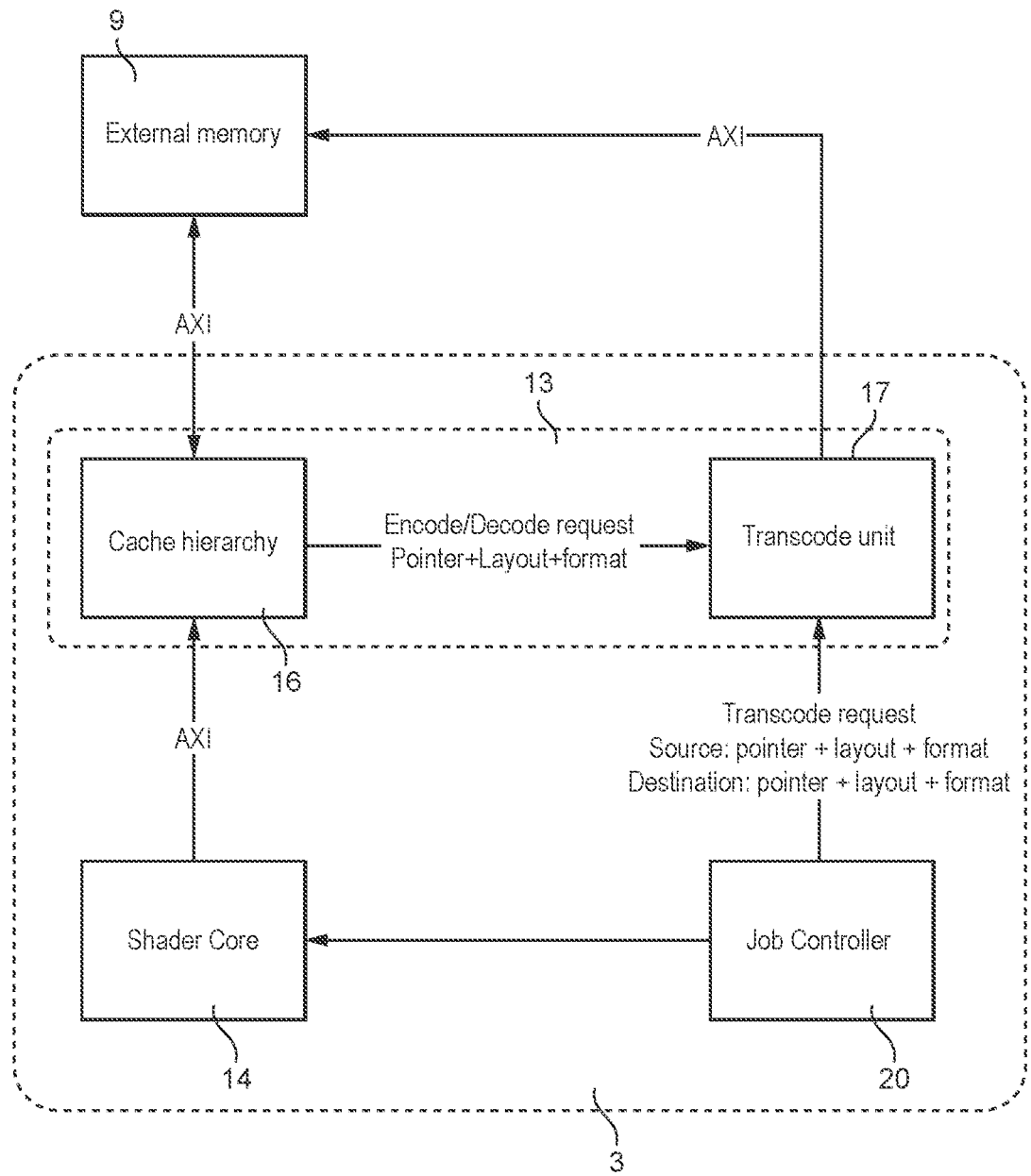
FIG. 4 shows schematically the main components and data flows of a graphics processing system in an embodiment of the technology described herein.

FIG. 4 shows schematically the main components and data flows of a graphics processing system in an embodiment of the technology described herein. FIG. 4 shows a job controller (command stream supervisor) 20 of the command stream frontend 15 (as shown in FIG. 1), which is operable to (control the command stream execution units of the command stream frontend 15 to execute commands of the command stream(s) to) send control signals to a shader core 14 of the graphics processor 3 and to the data encoder 17 (operating, in this embodiment, as a transcode unit), for controlling their respective operation in response to the commands of the command stream(s).

The job controller 20 and the shader core(s) 14 form part of the graphics processor 3 (i.e. they are on-chip). The data encoder 17 and the cache 16 form part of the cache system 13, which is separate and independent from the graphics processor 3 (i.e. off-chip). The off-chip graphics memory 9 is also separate and independent from the graphics processor 3 (i.e. off-chip) as well as from the cache system 13.

The shader core 14 is operable to request data from the cache 16, which in turn is operable to fetch data from and return data to the external, off-chip memory 9.

The cache 16 is operable to send control signals to the transcode unit 17 for encoding or decoding data that it is being sent to or received from die memory respectively. The control signal from the cache 16 comprises a request to encode or decode data, as well as a pointer to the location (in the cache 16 or the memory 9) of the data to encode or decode, information regarding the layout of the data and information regarding the compression format of the data. The information contained in the control signal thus allows the transcode unit 17 to perform the encoding or decoding operation as requested.

Similarly, the job controller 20 is operable to send control signals directly to the transcode unit 17 for, inter alia, requesting transcoding (or converting the layout of, converting the representation of or copying) data in the memory 9. The control signal from the job controller 20 comprises details of the transcoding (or data layout conversion, data representation conversion or memory to memory copying) request, as well as information relating to the "source" data to be read in and how the "destination" data is to be written out. The control signals are sent directly from the job controller 20 to the transcode unit 17, and thus do not involve (and are independent of) the shader core 14 and the cache 16.

The information relating to the "source" data to be read in includes a pointer to the location (in the memory 9) of the data to read in, as well as information regarding layout of the data and information regarding the compression format of the data (as stored in the memory 9). The information relating to the "destination" data to be written out includes a pointer to the location (in the memory 9) to which the data is to be written out, as well as information regarding layout of the data and information regarding the compression format of the data (as it is to be stored in the memory 9). Thus, the information contained in the control signal allows the transcode unit 17 to perform the transcoding (or data layout conversion, data representation conversion or memory to memory copying) operation as requested.

The transcode unit 17, for the operations outlined, based on control signals and requests from the cache 16 and the job controller 20, is operable to read data from, and write data to, the memory 9, as well as perform operations to convert the data from one compression format to another, to convert the data from one representation to another and to convert the data from one data layout to another, as may be required for data transcoding, representation conversion or layout conversion operations.

Operation of the graphics processing system 1 shown in FIGS. 1 to 4 will now be described, in particular operation of the transcode unit 17 when controlled by the job controller 20 to perform data transcoding and layout conversion operations.

Figure 5:
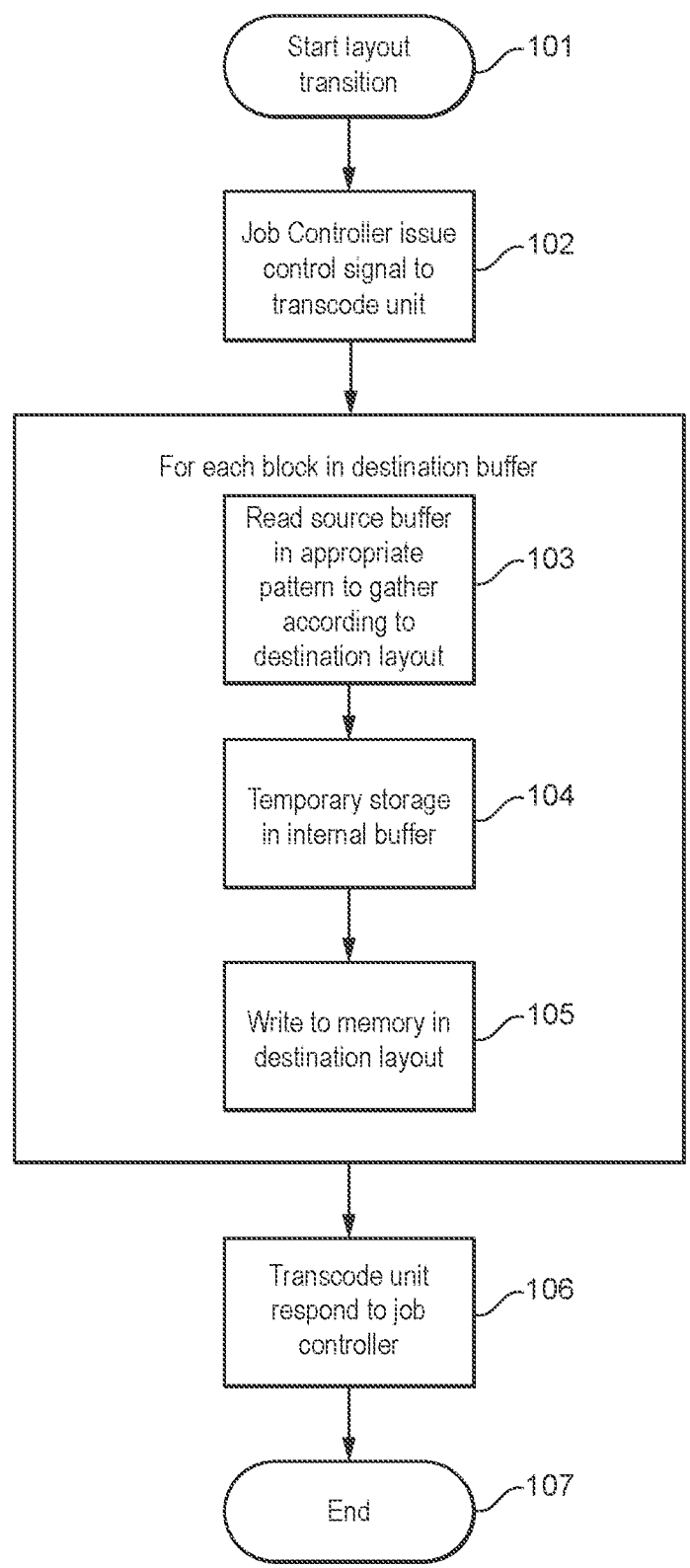
FIG. 5 is a flowchart showing a layout conversion operation in an embodiment of the technology described herein.

FIG. 5 is a flow chart showing a layout conversion operation in an embodiment of the technology described herein.

When the application 11 running on the host processor 2 wishes to perform a layout conversion operation (step 101, FIG. 5), the driver 12 on the host processor 2 prepares a sequence of commands (that form part of a command stream) for performing the operation. Such layout conversion operations are available in APIs (e.g. Vulkan) and allow layout conversions between, for example, a linear layout (such as VK_IMAGE_LINEAR in Vulkan) to a two dimensional array layout (such as VK_IMAGE_TILING_OPTIMAL in Vulkan, which is opaque to the CPU but is able to be used by the GPU hardware). This sort of layout conversion may, for example, be performed to put the data into a format that is suitable for encoding the data using a block-based compression scheme, e.g. using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2.

These commands, for example including a RUN_TRANSCODE command for the layout conversion operation, are read by the job controller 20 and, in response, the job controller 20 issues a control signal to the transcode unit 17 (step 102, FIG. 5) through execution of the commands by a command stream execution unit. As shown in FIG. 4, the control signal includes a request to perform the layout conversion operation, as well as information relating to the "source" data to be read in and how the "destination" data is to be written out.

The information relating to the "source" data to be read in includes a pointer to the location (in the memory 9) of the "source" data to read in, as well as information regarding layout of the "source" data (i.e. the layout in which the "source" data is stored and from which it is to be converted). The information relating to how the "destination" data is to be written out includes a pointer to the location (in the memory 9) to which the data is to be written out, as well as information regarding the layout for the "destination" data (i.e. the layout to which the "source" data is to be converted and stored).

In one example, the "source" data of an uncompressed texture is stored in the memory 9 in a linear (raster) layout. It is desired to transfer this texture from the (uncompressed) linear layout to a (compressed) block layout.

For each block of data of the texture that is to be written out to the memory 9, the transcode unit 17 reads in the linear data at the address in the memory 9 to which the source data pointer is directed and that corresponds to the block of data (step 103, FIG. 5). The information regarding the layout of the "source" data (in the control signal from the job controller 20) is used by the transcode unit 17 to read in this data according to this layout. The data is then stored temporarily in a data buffer 27 of the transcode unit 17, as shown in FIG. 3 (step 104, FIG. 5).

The data in the buffer 27 is then written back to the memory 9 at the destination address indicated by the destination data pointer and in the data layout as specified by the information in the control signal from the job controller 20 relating to the destination data (step 105, FIG. 5). Thus, the conversion of the data layout of the data (from the (uncompressed) linear layout to a (compressed) block layout) is performed when writing out the block of data to the memory 9. The block-based layout may comprise a block interleaved layout, e.g. using the frame buffer compression techniques described in the Applicant's U.S. Pat. No. 8,542,939 B2, U.S. Pat. No. 9,014,496 B2, U.S. Pat. No. 8,990,518 B2 and U.S. Pat. No. 9,116,790 B2. The destination address may be the same or a different address in the memory 9 as the source address of the data.

Once the transcode unit 17 has performed the data layout conversion operation for the all the necessary blocks of data (i.e. those specified in the control signal from the job controller 20), the transcode unit 17 responds back to the job controller 17 to signal that the operation has been completed (step 106, FIG. 5) and the process ends (step 107, FIG. 5).

Figure 6:
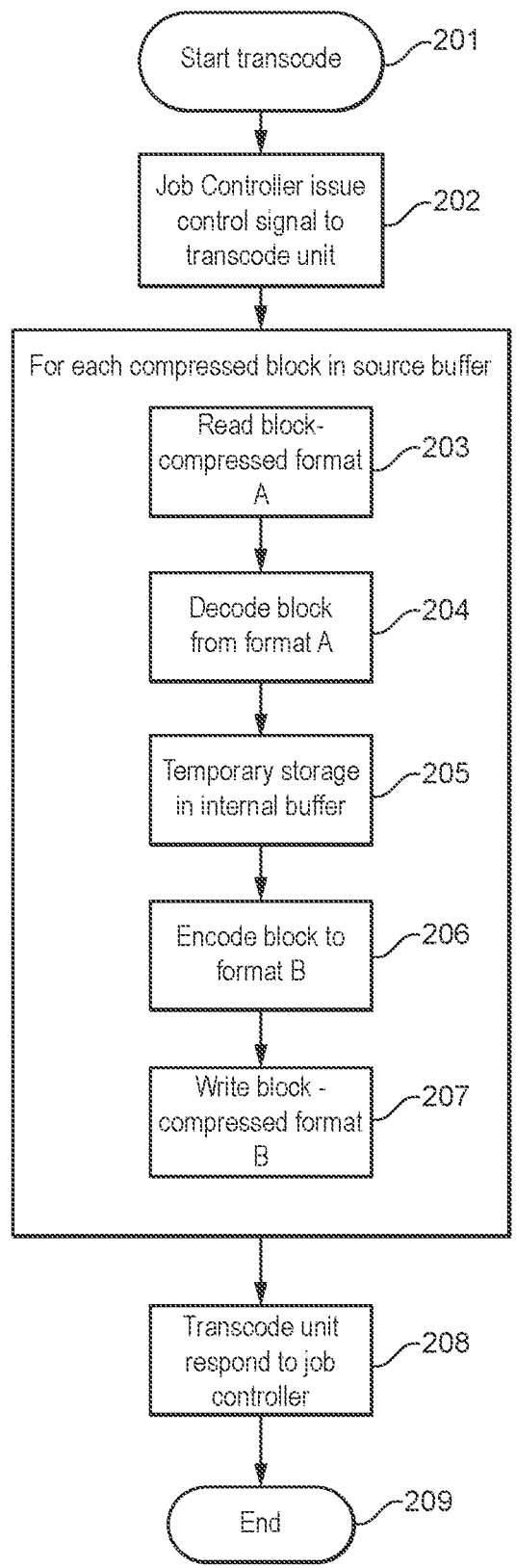
FIG. 6 is a flowchart showing a data transcoding operation in an embodiment of the technology described herein.

FIG. 6 is a flowchart showing a data transcoding operation in an embodiment of the technology described herein.

When the application 11 running on the host processor 2 wishes to perform a data transcoding operation (step 201, FIG. 6), the driver 12 on the host processor 2 prepares a sequence of commands (that form part of a command stream) for performing the operation "RUN_TRANSCODE". These commands are read by the job controller 20 and, in response, the job controller 20 issues a control signal to the transcode unit 17 (step 202, FIG. 6) through execution of the commands by a command stream execution unit. As shown in FIG. 4, the control signal includes a request to perform the data transcoding operation, as well as information relating to the "source" data to be read in and how the "destination" data is to be written out.

The information relating to the "source" data to be read in includes a pointer to the location (in the memory 9) of the "source" data to read in, as well as information relating to the compression format of the "source" data (i.e. the compression format in which the "source" data is stored and from which it is to be decoded). The information relating to how the "destination" data is to be written out includes a pointer to the location (in the memory 9) to which the "destination" data is to be written out, as well as information relating to the compression format into which the "destination" data is to be encoded and written out.

In this example, the "source" data is stored in the memory 9 as blocks of compressed data (in compression format "A"). For each block of "source" data stored in the memory 9, at the address in the memory 9 to which the source data pointer is directed, the transcode unit 17 reads in the block of data (step 203, Figure. 6). The compressed data is decoded (e.g. on reading the "source" data into the transcode unit 17) using the information regarding the compression format of the source data in the control signal from the job controller 20 (step 204, FIG. 6). The uncompressed data is then stored temporarily in a data buffer 27 of the transcode unit 17, as shown in FIG. 3 (step 205. FIG. 6).

The uncompressed data in the buffer 27 is then encoded into a block of compressed data according to the compression format "B" specified in the information in the control signal from the job controller 20 (step 206, FIG. 6). The encoded block of compressed data is written back to the memory 9 at the destination address in the memory 9 indicated by the destination data pointer as specified by the information in the control signal from the job controller 20 (step 207, FIG. 6), to be stored as a block of compressed data in the memory 9. The encoding of the data into the block of compressed data may be performed when writing out the data to the memory 9, e.g. in a combined step. The destination address may be the same or a different address in the memory 9 as the source address of the data.

Once the transcode unit 17 has performed the data transcoding operation for the all the necessary blocks of data i.e. those specified in the control signal from the job controller 20), the transcode unit 17 responds back to the job controller 17 to signal that the operation has been completed (step 208, FIG. 6) and the process ends (step 209, FIG. 6).

While the data layout conversion and transcoding operations shown in FIGS. 5 and 6 have been illustrated individually, it will be appreciated that a combination of a data layout conversion and a transcoding operation may be performed. In such an operation, the control signal from the job controller 20 may include, inter alia, the data layouts of the source and destination data, as well as the compression formats of the source and destination data.

In this combined embodiment, the compressed data is read in and decoded by the transcoding unit 17 from the memory 9, using the information relating to the compression format and the data layout of the source data. The data is stored in the buffer 27 of the transcoding unit 17. The data is then written out to the memory 9 in the data layout of the destination data and encoded in the compression format of the destination data. The data layout conversion and compression format transcoding operations, on writing out the data, may be performed as a combined operation or as sequential operations, as appropriate.

Similarly, a memory to memory copy operation may be performed in the manner of the embodiments shown in FIGS. 5 and 6. For a memory to memory copy operation, the control signal from the job controller may just include an indication that it is a memory to memory copy operation that is to be performed, along with the source data and destination data memory addresses.

It can be seen from the above that, in at least some embodiments, the technology described herein comprises a graphics processing system and a method of operating a graphics processing system in which data is read in from the memory and written back to the memory by a data encoder of a cache system. Owing to the data not needing to be handled by the graphics processor or the cache, this process is faster and more efficient. Using the data encoder for these (e.g. memory transcoding and copying) operations, frees up the graphics processor for other (e.g. more intensive, graphics processing) operations, and may also be more energy efficient than running the graphics processor to perform these tasks.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of operating a graphics processing system, the graphics processing system comprising:
   a graphics processor; and
   an external memory system;
   wherein the graphics processor comprises:
      one or more execution cores; and
      an internal memory system comprising:
         an internal memory configured to store data for use by the one or more execution cores of the graphics processor when performing graphics processing operations, and
         a data encoder associated with the internal memory and operable to read data from the external memory system and store it in the internal memory, and read data from the internal memory and store it in the external memory system;
   wherein the graphics processor further comprises:
      a controller operable to control the data encoder;
         wherein the controller controls the data encoder directly, independently of the one or more execution cores of the graphics processor;
   the method comprising:
      the controller, in response to commands in a command stream for performing a data handling operation, issuing one or more control signals to the data encoder; and
      the data encoder, in response to the one or more control signals:
         reading data from the external memory system to the data encoder;
         optionally processing the read in data; and
         returning the, optionally processed, data to the external memory system from the data encoder;
         wherein the data encoder reads in the data from the external memory system and returns the data to the external memory system from the data encoder, without storing the data in the internal memory.

2. The method as claimed in claim 1, wherein the method further comprises storing the data that is read in by the data encoder in a local storage of the data encoder.

3. The method as claimed in claim 1, wherein the method further comprises reading the data from and returning the data back to different locations in the external memory system.

4. The method as claimed in claim 1, wherein the method further comprises:
   the data encoder reading in compressed data from the external memory system to the data encoder;
   the data encoder decoding the compressed data from a first compressed data format into an uncompressed format;
   the data encoder encoding the uncompressed data into a second, different compressed format; and
   the data encoder writing out the compressed data to the external memory system.

5. The method as claimed in claim 1, wherein the method further comprises:
   the data encoder reading in data to the data encoder that is stored in a first data layout in the external memory system; and
   the data encoder writing out the data from the data encoder to be stored in a second, different data layout in the external memory system.

6. The method as claimed in claim 1, wherein the graphics processing system comprises a host processor comprising a command stream generating circuit;
   wherein the method comprises:
      in response to a request for a data handling operation to be performed from an application being executed on the host processor, the command stream generating circuit preparing a command stream for causing the data encoder to perform the data handling operation for the application, the command stream including a sequence of one or more commands for implementation by the data encoder; and the controller, in response to the sequence of one or more commands, controlling the data encoder to implement the one or more commands to perform the data handling operation.

7. The method as claimed in claim 1, wherein the one or more control signals issued to the data encoder for implementing commands for graphics handling operations comprise an indication of one or more of: the type of processing task to perform for the data handling operation; the location of the data to be read in from the external memory; the size of the data to be read in from the external memory; the data layout of the data to be read in; the compression format of the data to be read in; the compression rate of the data to be read in; the location to which the data is to be written out; the size of the data to be written out; the data layout in which the data is to be written out; the compression format in which the data is to be written out; and the compression rate at which the data is to be written out.

8. A graphics processing system comprising:
a graphics processor; and
an external memory system;
wherein the graphics processor comprises:
one or more execution cores; and
an internal memory system comprising:
an internal memory configured to store data for use by the one or more execution cores of the graphics processor when performing graphics processing operations; and
a data encoder associated with the internal memory and operable to:
read data from the external memory system and store it in the internal memory, and read data from the internal memory and store it in the external memory system;
wherein the graphics processor further comprises a controller operable to:
control the data encoder directly, independently of the one or more execution cores of the graphics processor; and
issue one or more control signals to the data encoder, in response to commands in a command stream for performing a data handling operation;
wherein the data encoder is further controllable to, in response to the one or more control signals:
read in data from the external memory system to the data encoder, optionally perform some processing on the read in data; and
return the, optionally processed, data to the external memory system, without the data encoder storing the data in the internal memory;
wherein the data encoder is controllable to read in the data from the external memory system and return the data to the external memory system from the data encoder, without storing the data in the internal memory.

9. The graphics processing system as claimed in claim 8, wherein the data encoder comprises a local storage for storing the data that is read by the data encoder, wherein the data encoder is configured and controllable to store the data read from the external memory in the storage.

10. The graphics processing system as claimed in claim 8, wherein the data encoder is configured and controllable to read data from and return the data to different locations in the external memory system.

11. The graphics processing system as claimed in claim 8, wherein the data encoder is configured and controllable to:
read in compressed data from the external memory system to the data encoder;
decode the compressed data from a first compressed data format into an uncompressed format;
encode the uncompressed data into a second, different compressed format; and
write out the compressed data to the external memory system.

12. The graphics processing system as claimed in claim 8, wherein the data encoder is configured and controllable to:
read data that is stored in a first data layout in the external memory system; and
write out the data to be stored in a second, different data layout in the external memory system.

13. The graphics processing system as claimed in claim 8, wherein the graphics processing system comprises a host processor comprising a command stream generating circuit; wherein the command stream generating circuit is operable to:
prepare, in response to a request for a data handling operation to be performed from an application being executed on the host processor, a command stream for causing the data encoder to perform the data handling operation for the application,
wherein the command stream includes a sequence of one or more commands for implementation by the data encoder;
wherein the controller is operable to, in response to the sequence of one or more commands, control the data encoder to implement the one or more commands to perform the data handling operation.

14. The graphics processing system as claimed in claim 8, wherein the one or more control signals issued to the data encoder for implementing commands for data handling operations comprise an indication of one or more of: the type of processing task to perform for the data handling operation; the location of the data to be read in from the external memory; the size of the data to be read in from the external memory; the data layout of the data to be read in; the compression format of the data to be read in; the compression rate of the data to be read in; the location to which the data is to be written out; the size of the data to be written out; the data layout in which the data is to be written out; the compression format in which the data is to be written out; and the compression rate at which the data is to be written out.

15. A non-transitory computer readable storage medium storing computer software code which when executing on a graphics processor performs a method of operating a graphics processing system, the graphics processing system comprising:
a graphics processor; and
an external memory system;
wherein the graphics processor comprises:
one or more execution cores; and
an internal memory system comprising:
an internal memory configured to store data for use by the one or more execution cores of the graphics processor when performing graphics processing operations, and
a data encoder associated with the internal memory and operable to read data from the external memory system and store it in the internal memory, and read data from the internal memory and store it in the external memory system;

wherein the graphics processor further comprises:
  a controller operable to control the data encoder;
    wherein the controller controls the data encoder directly, independently of the one or more execution cores of the graphics processor;
the method comprising:
  the controller, in response to commands in a command stream for performing a data handling operation, issuing one or more control signals to the data encoder; and
  the data encoder, in response to the one or more control signals:
    reading data from the external memory system to the data encoder;
    optionally processing the read in data; and
    returning the, optionally processed, data to the external memory system from the data encoder;
    wherein the data encoder reads in the data from the external memory system and returns the data to the external memory system from the data encoder, without storing the data in the internal memory.

\* \* \* \* \*